United States Patent [19]
Fuchs et al.

[11] Patent Number: 6,026,943
[45] Date of Patent: Feb. 22, 2000

[54] SEGMENTED RESERVOIR FOR VISCOUS CLUTCHES

[75] Inventors: Ralf J. Fuchs, Meckenbeuren; Thomas Buchholz, Friedrichshafen; Christian M. Tilly, Uhldingen, all of Germany

[73] Assignee: Eaton Corporation, Cleveland, Ohio

[21] Appl. No.: 09/293,355

[22] Filed: Apr. 16, 1999

[51] Int. Cl.[7] .................................................... F16D 35/02
[52] U.S. Cl. ...................................... 192/58.61; 192/58.8
[58] Field of Search ................................ 192/58.61, 58.8

[56] References Cited

U.S. PATENT DOCUMENTS

| | | |
|---|---|---|
| 3,227,254 | 1/1966 | Sutaruk . |
| 4,305,491 | 12/1981 | Rohrer . |
| 4,469,209 | 9/1984 | Hayashi et al. ............... 192/58.8 X |
| 4,974,712 | 12/1990 | Brown .......................... 192/58.8 X |
| 5,152,383 | 10/1992 | Boyer et al. . |
| 5,722,523 | 3/1998 | Martin ............................. 192/58.61 |

*Primary Examiner*—Richard M. Lorence
*Attorney, Agent, or Firm*—L. J. Kasper

[57] ABSTRACT

A fluid coupling device in which the input coupling member (11) includes a plate-like member (29) defining a first inlet port (63), and a second inlet port (67) disposed radially outward of the first inlet port. The device includes a valve member (43) having a disengaged position (FIG. 4) blocking flow through both inlet ports. As the valve member (43) moves from the disengaged position toward a first operating position (FIG. 5) the first inlet port (63) is uncovered, while the second inlet port (67) remains covered. Continued movement of the valve member results in progressive uncovering of the second inlet port (67). Finally, there is a third inlet port (73), radially outward from the second inlet port (67), and further movement of the valve member (43) eventually uncovers the third inlet port. As the valve member moves, after uncovering the first inlet port, it passes through a dead band region (D1), then after uncovering the second inlet port, it passes through a dead band region (D2), in both cases helping to insure that the desired amount of fluid has been communicated into the operating chamber (35).

8 Claims, 6 Drawing Sheets

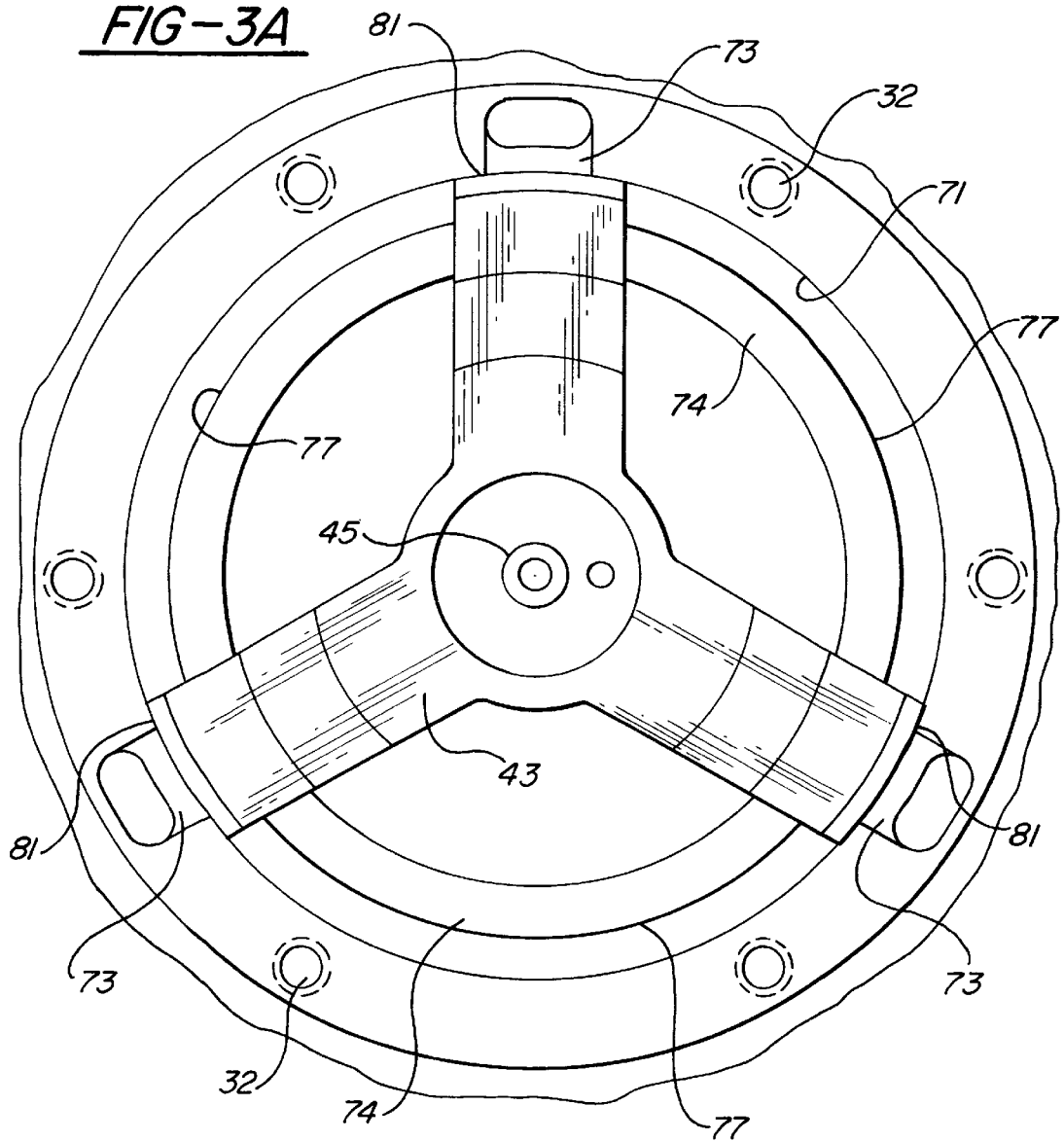

SEGMENTED RESERVOIR FOR VISCOUS CLUTCHES

BACKGROUND OF THE DISCLOSURE

The present invention relates to viscous fluid couplings, and more particularly to such couplings which are used to drive vehicle radiator cooling fans, wherein it is desired to control the engagement or disengagement of the viscous fluid coupling in an open loop manner.

Viscous fluid couplings have been in commercial use for many years to drive vehicle radiator cooling fans, especially on vehicles such as automobiles and light trucks. The use of such viscous couplings has been widespread because such couplings can operate in either an engaged condition, or a disengaged condition, depending upon a sensed temperature condition, indicating the need, or lack of need, respectively, for cooling of the radiator. Most of the couplings (viscous fan drives) which have been in commercial use include some form of temperature-sensing bimetalic element which senses ambient air temperature adjacent the fan drive, and controls valving within the fan drive in response to the sensed temperature, to achieve either the engaged or the disengaged condition, as is appropriate.

In certain vehicle applications, it has become desirable to sense directly the temperature of the liquid coolant entering the radiator, and to control the valving within the viscous fan drive in response to the coolant temperature, whereby the responsiveness of the fan drive is improved, when compared to the conventional fan drive which senses only the ambient air temperature.

Typically, the sensed temperature (for example, the "top tank" temperature at the radiator) has been converted into an electrical signal, and used to control the movement of the valving by some sort of an electrical or electromechanical means. An example of such a viscous fluid coupling, is illustrated and described in U.S. Pat. No. 5,152,383, assigned to the assignee of the present invention, and incorporated herein by reference.

In electromagnetically controlled viscous fluid couplings, it has been considered necessary to sense actual fan speed, and generate a corresponding feedback signal which is then transmitted to the vehicle microprocessor. This feedback signal is used to modify the main command signal to the electromagnetic means which controls the valving of the coupling. In other words, such viscous coupling devices have been controlled by a control system of the "closed loop" type as that term is generally understood by those skilled in the control art. Such closed loop control can provide excellent performance, in terms of achieving engagement or disengagement of the coupling, as is appropriate. However, the need to sense actual fan speed and provide a feedback signal, etc., adds substantially to the cost and complexity of the coupling and its control system.

Accordingly, it is an object of the present invention to provide an improved viscous coupling, device in which output coupling speed (fan speed) can be controlled accurately, relative to an electrical input signal, without the cost and complexity of a closed loop control system, i.e., in which the output coupling speed can be controlled by controlling the coupling in an "open loop" manner.

One of the reasons for the difficulty of achieving accurate open loop control of a viscous coupling has been the lack of predictability of the level of fluid fill in the operating chamber for a given level of input to the valving of the coupling. One reason for this lack of predictability in a conventional coupling device is that the fluid fill level represents an attempted balance between the fill rate at the inlet port and the discharge rate at the pump out port. As is known to those skilled in the art, the fill rate is typically a function of the output speed of the coupling device, because in the conventional coupling device, the fluid reservoir is disposed within the output member, and rotates at output speed.

Therefore, it is another object of the present invention to provide an improved fluid coupling device having improved valving whereby there is a more predictable relationship between fill level in the operating chamber (output speed) and the input signal to the valving than was possible in prior art couplings and control systems.

It is a related object of the invention to improve the predictability of the output speed vs. input signal relationship by making the pressure in the fluid reservoir independent of output speed, i.e., by providing a coupling device of the reservoir-in-clutch type.

It is another related object of the invention to be able to maintain certain fan speeds, and especially certain intermediate fan speeds accurately, as a function of input signal, by the design (geometry) of the fluid reservoir, somewhat independent of tolerances of the various parts.

For a number of years it has been known in the viscous coupling art to provide valving having "modulation" capability. Such capability is illustrated and described in U.S. Pat. No. 3,227,254, assigned to the assignee of the present invention and incorporated herein by reference. In a modulating fluid coupling device, rather than the fill port opening suddenly, whereby there is a relatively high gain rate in the output speed versus the valve position, the opening of the valving occurs over a wider range of inputs, for a lower gain rate of output speed versus input to the valving. Unfortunately, it has been observed in some modulating type fluid coupling devices that the desire to provide the modulation capability has interfered with or hindered the achievement of certain other important performance characteristics, such as the required peak speed.

Accordingly, it is an additional object of the present invention to provide an improved fluid coupling device of the modulating type which is capable of achieving good modulation performance while still being capable of achieving other required performance characteristics.

BRIEF SUMMARY OF THE INVENTION

The above and other objects of the invention are accomplished by the provision of an improved fluid coupling device of the type including a first rotatable coupling member defining an axis of rotation, and closure means associated with the first coupling member to define a fluid chamber therebetween. Valve means is disposed to separate the fluid chamber into a fluid operating chamber and a fluid reservoir chamber. A second rotatable coupling member is disposed in the fluid operating chamber and is rotatable relative to the first coupling member. At least one of the first coupling member and the enclosure means cooperates with the second coupling member to define therebetween a viscous shear space. The valve means is operable to control the flow of fluid between the reservoir chamber and the operating chamber and includes control means associated with the valve means to effect the operation thereof in response to variations in a predetermined condition. The valve means includes a plate-like member defining a fluid inlet port disposed to permit fluid flow from the reservoir chamber to the operating chamber. The valve means further includes a moveable valve member operably associated with the control means.

The improved fluid coupling device is characterized by the plate-like member defining a first inlet port and a second inlet port disposed radially outward of the first inlet port. The moveable valve member has a disengaged position blocking flow through both the first and second inlet ports. The valve member is configured such that, as the valve member moves from the disengaged position toward a first operating position, the first inlet port is uncovered while the second inlet port remains covered. As the valve member moves from the first operating position toward a second operating position, the second inlet port is progressively uncovered.

BRIEF DESCRIPTION OF THE DRAWINGS

FIG. 3A is a fragmentary, front plan view, on a scale somewhat larger than FIG. 1, included primarily to illustrate the valve arm of the present invention.

DETAILED DESCRIPTION OF THE PREFERRED EMBODIMENT

Figure 1:
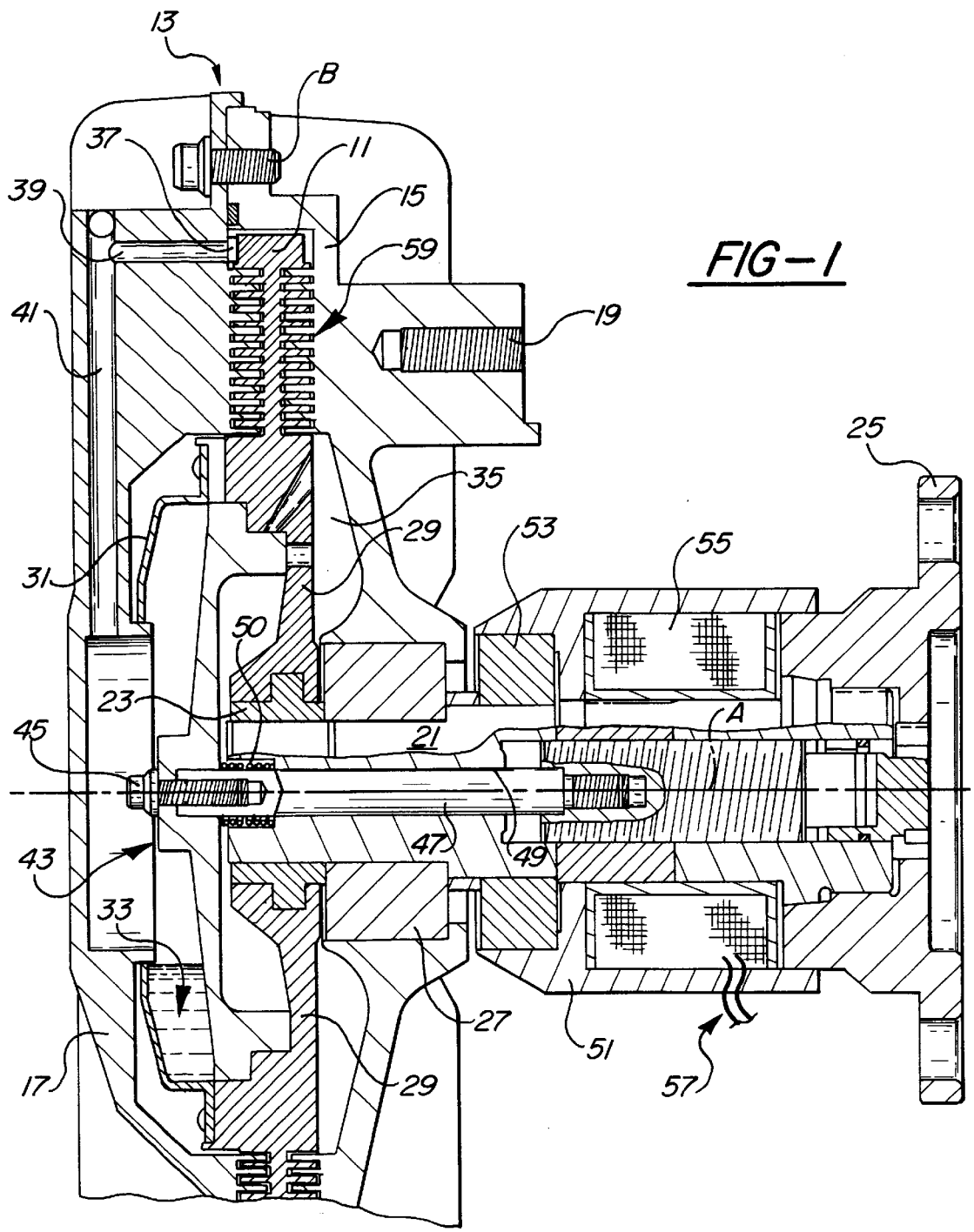
FIG. 1 is a fragmentary, axial cross-section of a fluid coupling device made in accordance with the teachings of the present invention.

Referring now to the drawings, which are not intended to limit the invention, FIG. 1 illustrates one preferred form of a fluid coupling device (viscous fan drive) of the type utilizing the present invention. The fluid coupling device illustrated in FIG. 1 includes an input coupling member, generally designated 11, and an output coupling assembly, generally designated 13. The output coupling assembly 13 includes a housing member (body) 15 and a cover member 17, the members 15 and 17 being secured together by a plurality of bolts B disposed toward the outer periphery of the members 15 and 17, in a manner well known to those skilled in the art. The fluid coupling device is adapted to be driven by a liquid cooled engine (not shown) and, in turn, drives a radiator cooling fan (also not shown) which may be attached to the housing member 15 by means of a plurality of threaded bores 19, adapted to receive bolts (not shown). It will be understood, however, that the use of the present invention is not limited to any particular configuration of fluid coupling device, or to any particular application thereof, except as is specifically noted hereinafter.

The fluid coupling device includes an input shaft 21 on which the input coupling member 11 is mounted, preferably by means of an insert member 23. The input shaft 21 is rotatably driven, typically by means of a flange 25 which may be bolted to the mating flange of an engine water pump (not shown). The input shaft 21 functions as a support for the inner race of a bearing set 27, which is seated on the inside diameter of the housing member 15. The forward end of the input shaft 21 and the insert member 23 are received within a plate-like member 29, comprising, by way of example only, part of the input coupling member 11. In accordance with a detailed aspect of the present invention, the plate-like member 29 also comprises part of the coupling valve means, to be described subsequently. Therefore, rotation of the input shaft 21 results in rotation of the input coupling member 11.

Although not an essential feature of the present invention, the subject embodiment is a fluid coupling device of the "reservoir-in-clutch" type. To that end, an enclosure member 31 is attached to a forward surface of the input coupling member 11, such as by bolts or rivets passing through openings 32 in the input coupling member 11 (see FIG. 3A). The enclosure member 31 cooperates with the plate-like member 29 to define a fluid reservoir chamber 33. As may best be seen in FIG. 1, when the coupling device is rotating, and in the disengaged position of FIG. 4, substantially all of the fluid in the device would be contained within the annular reservoir chamber 33. The space between the plate-like member 29 and the housing 15 comprises part of an operating chamber 35, with the rest of the operating chamber comprising the fluid chamber defined between the housing 15 and the cover 17. Disposed toward the outer periphery of the operating chamber 35 is a pumping element (wiper) 37, the function of which, as is well known to those skilled in the art, is to pump fluid from the operating chamber, in response to a speed difference ("slip speed") between the input coupling member 11 and the output coupling assembly 13. The pumped fluid flows through an axial passage 39, and then through a radial passage 41, so that it flows radially inward and then, through the effect of centrifugal force, flows radially outward into the fluid reservoir chamber 33.

Disposed within the fluid reservoir chamber 33 is an axially moveable valve member, generally designated 43 (see also FIG. 3A), which is attached by means of a bolt 45 to the forward end of an armature 47. The armature 47 is axially moveable within a bore 49 defined by the input shaft 21, and the combination of the valve arm 43 and the armature 47 is biased forwardly (to the left in FIG. 1) by means of a biasing spring 50. Disposed about a rearward end (right end in FIG. 1) of the input shaft 21 is an actuator housing 51, supported relative to the input shaft 21 by means of a bearing set 53. Disposed radially between the input shaft 21 and the actuator housing 51 is an electromagnetic coil 55, which receives an input signal, energizing the coil 55, by means of a pair of electrical leads, designated somewhat schematically as 57. This general type of arrangement is known from U.S. Pat. No. 4,305,491, assigned to the assignee of the present invention, and incorporated herein by reference. It should be understood by those skilled in the art that the arrangement shown herein of the armature 47 and coil 55 is by way of example only, and within the scope of the present invention, various other means could be used to actuate the valve member 43. Such actuation could be achieved by various other electromagnetic arrangements, as well as by various mechanical, hydraulic, and pneumatic arrangements. In addition, within the scope of the present invention, the actuation of the valve member 43 could be achieved from either the rear of the coupling (right end in FIG. 1) or from the front of the coupling (left end in FIG. 1).

In the subject embodiment, and by way of example only, the input coupling member 11 includes a forward surface which defines a plurality of annular lands, and a rearward surface which also defines a plurality of annular lands. The adjacent surfaces of the cover member 17 and housing member 15, respectively, form a plurality of annular lands which are interdigitated with those defined by the input coupling member 11, to define a serpentine-shaped viscous shear space, generally designated 59. It should be noted in FIG. 1 that, for simplicity, not all of the "bottom" half of the coupling device is illustrated.

Valving

Figure 2:
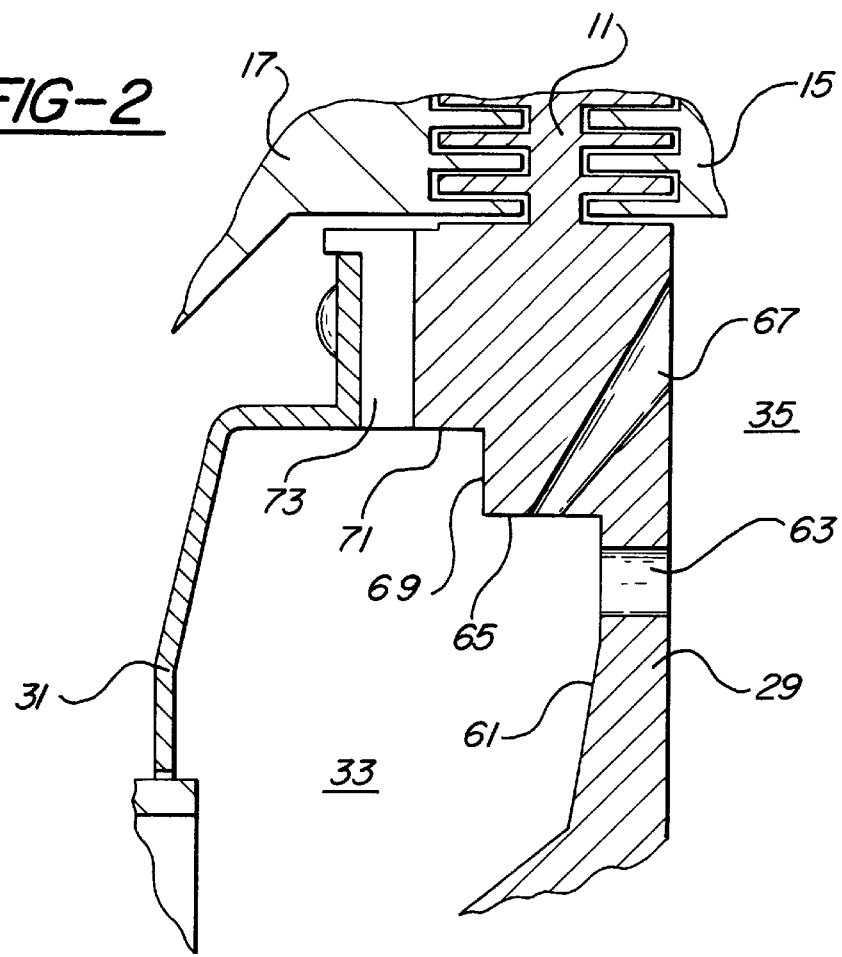
FIG. 2 is an enlarged, fragmentary axial cross-section, similar to FIG. 1, illustrating the valve plate of the present invention in detail.

Referring now primarily to FIG. 2, one important aspect of the present invention will be described. The plate-like member 29 defines a forward, transverse surface 61. As is used herein, the term "transverse" means generally perpendicular to an axis of rotation A (see FIG. 1). The member 29 defines a fluid inlet port 63, extending from the surface 61 through the member 29 into the operating chamber 35. As may best be seen in FIG. 3A, the valve member 43 has three separate valve arms. Therefore, in the description of the valving, there is one of the various ports being described associated with each of the three valve arms. Disposed radially outward from the inlet port 63, the member 29 defines a generally cylindrical surface 65, with a fluid inlet port 67 extending from the surface 65 through the member 29 and also into the operating chamber 35. Preferably, the inlet port 67 has some fairly substantial axial extent, for reasons which will become apparent subsequently. The member 29 defines another transverse, annular surface 69, extending radially outward from the surface 65, to another generally cylindrical surface 71. Finally, the member 29 defines a fluid inlet port 73 extending from the surface 71 radially outward to the beginning of the viscous shear space 59. It should be noted that the specific location, orientation, and arrangement of the various surfaces and ports just described are not essential features of the invention.

Figure 3:
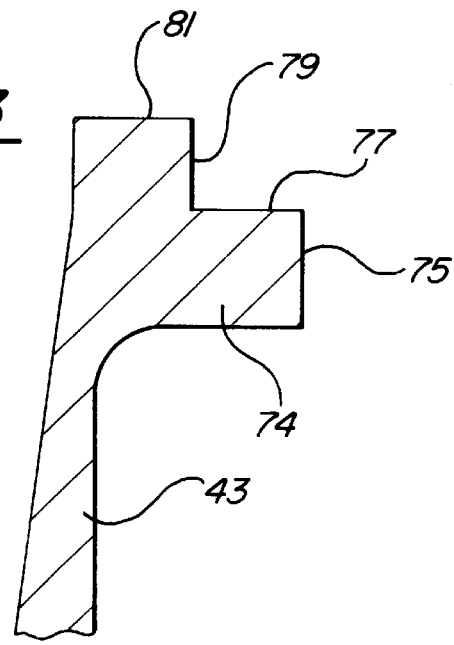
FIG. 3 is an enlarged, fragmentary axial cross-section, similar to FIG. 1, and on the same scale as FIG. 2, illustrating the valve member of the present invention in detail.
Figure 4:
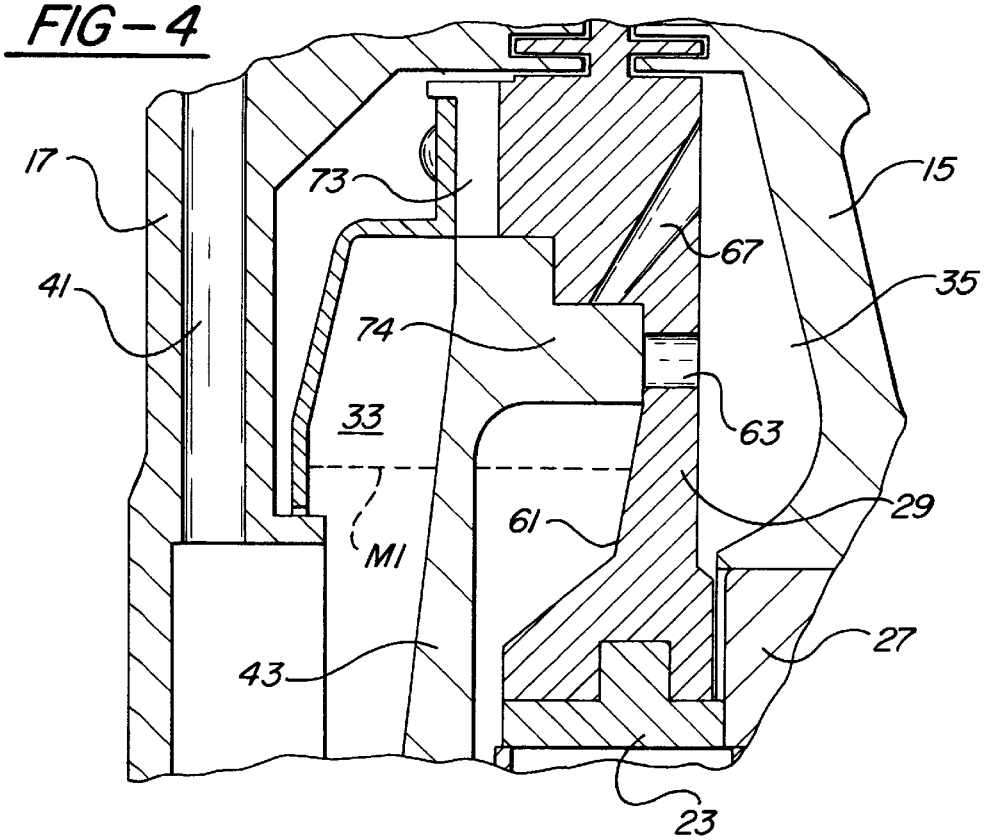
FIG. 4 is an enlarged, fragmentary axial cross-section, similar to FIG. 1, illustrating the valving of the present invention in its disengaged position.

Referring now primarily to FIGS. 3 and 4, the valve member 43 includes a radially outer valve portion 74 which defines a transverse surface 75. As may best be seen in FIG. 4, the transverse surface 75 is disposed for face-to-face engagement with the transverse surface 61, when the valve member 43 is in its disengaged position. The valve portion 74 also defines a generally cylindrical surface 77, disposed for sliding engagement with the cylindrical surface 65. As may best be seen in FIG. 3A, the valve portion 74 is preferably in the form of an annular member, formed integrally with each of the individual valve arms. The valve portion 74 defines a annular, transverse surface 79, disposed for engagement with the annular surface 69 when the valve arm 43 is in the disengaged position of FIG. 4. Finally, the valve portion 74 defines a generally cylindrical outer surface 81, disposed for sliding engagement with the cylindrical surface 71.

Therefore, with the valve arm 43 in the disengaged position of FIG. 4, the transverse surface 75 block fluid flow through the inlet port 63; the cylindrical surface 77 blocks fluid flow through the inlet port 67, and the cylindrical surface 81 blocks fluid flow through the inlet port 73. As will be understood by those skilled in the art, with the valve member 43 in the disengaged position of FIG. 4, the fluid level ("meniscus") within the reservoir chamber 33 may be represented by the line labeled "M1" in FIGS. 4 and 7, i.e., the reservoir contains an annulus of fluid which extends radially inward to the line M1. By way of example only, the energization of the coil 55, by means of an appropriate signal 57, exerts a biasing force on the armature, in opposition to the biasing force of the spring 50. Thus, a "maximum" signal 57 is required to bias the valve arm 43 to the disengaged position shown in FIG. 4

Figure 5:
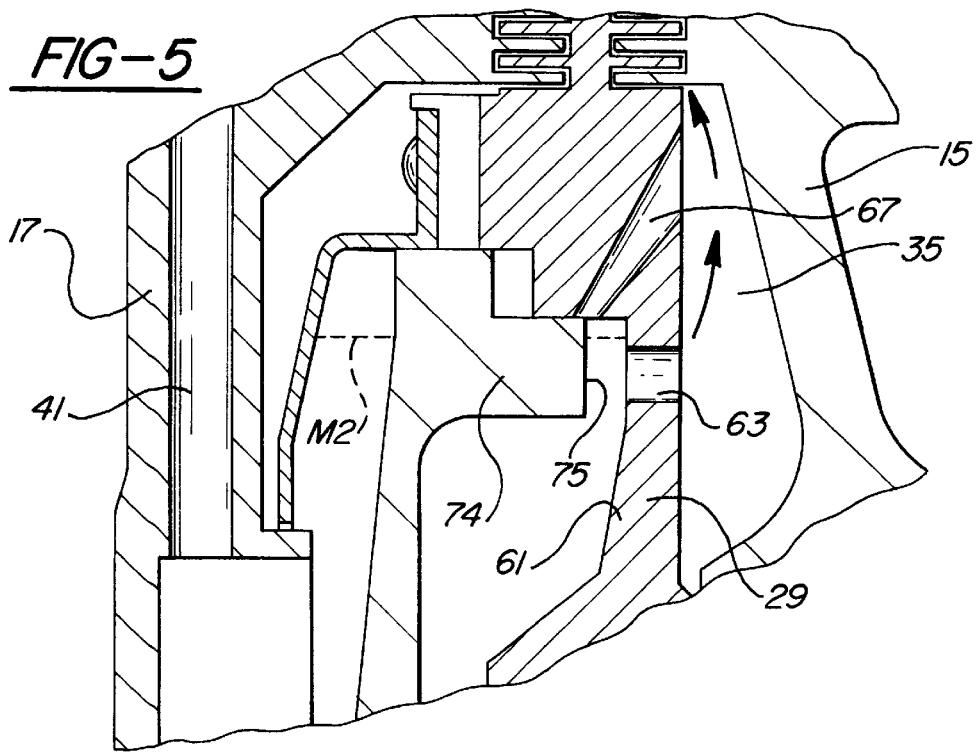
FIG. 5 is an enlarged, fragmentary axial cross-section, similar to FIG. 4, but with the valving in a modulating operating position.
Figure 6:
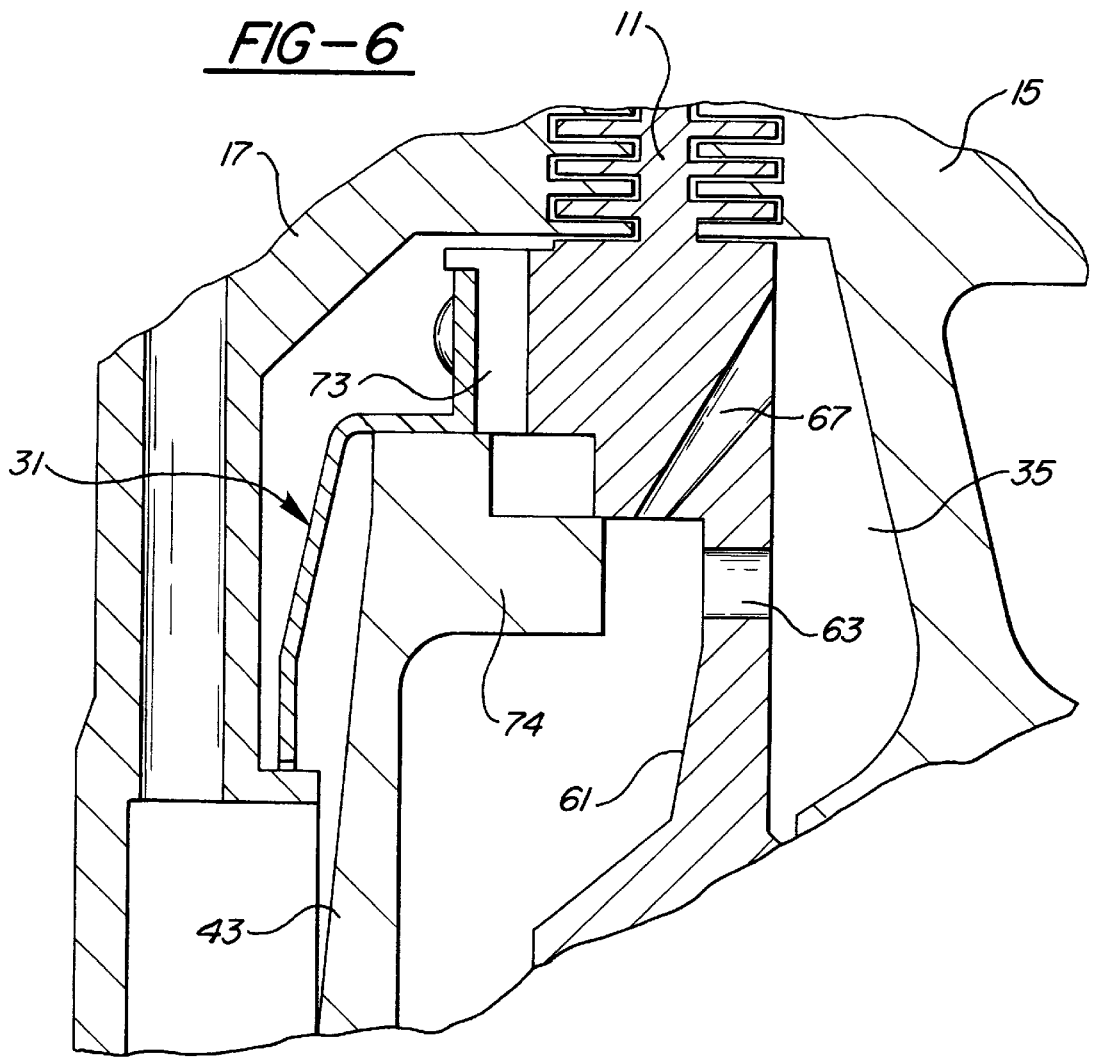
FIG. 6 is an enlarged, fragmentary axial cross-section, similar to FIGS. 4 and 5, but with the valve member in an engaged operating position.
Figure 7:
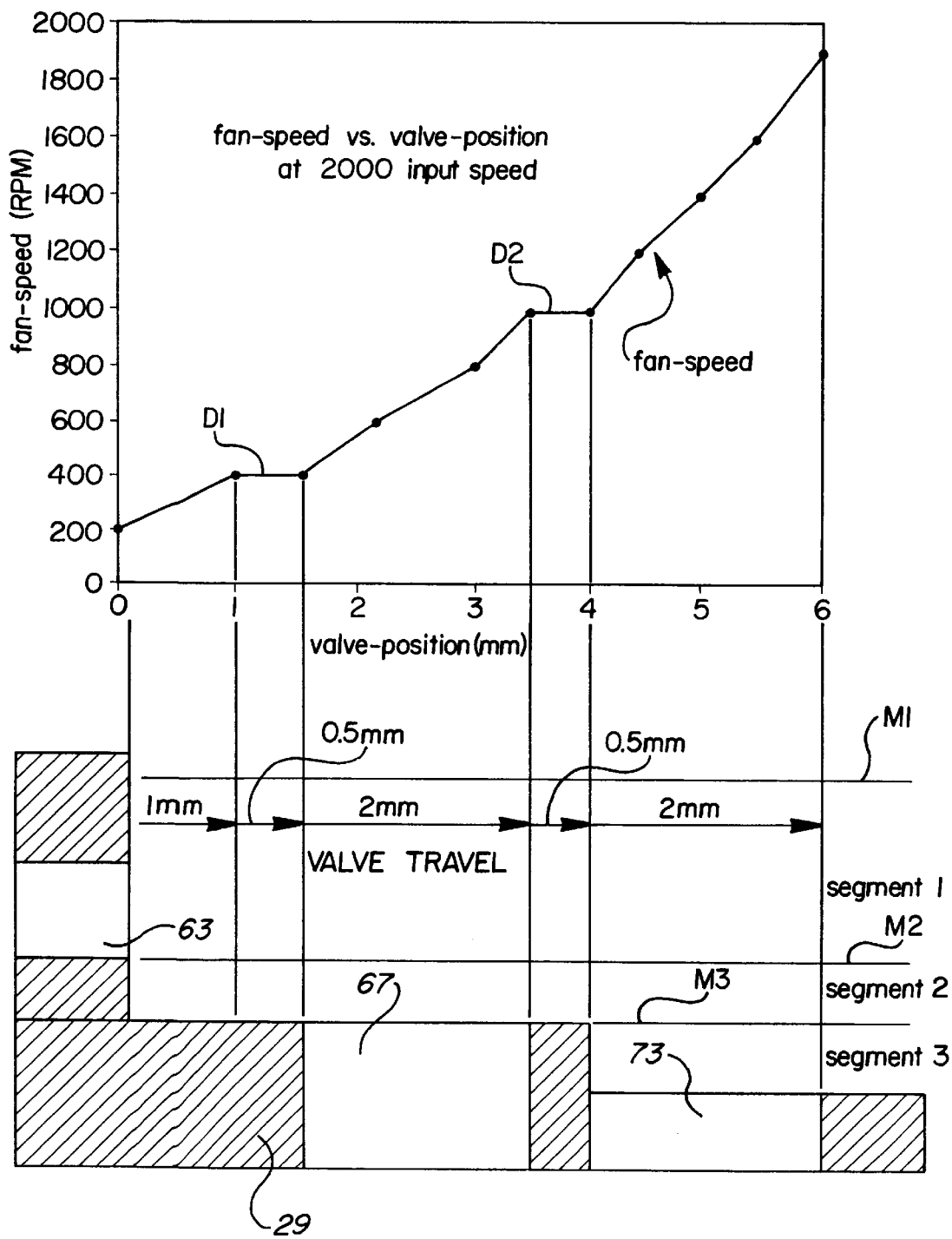
FIG. 7 is a graph of fan speed versus valve position, aligned with a somewhat schematic representation of the valve plate, illustrating the operation of the present invention, and the various fluid segments involved.

Referring now primarily to FIG. 5, as the temperature (or other operating condition) increases, a decreasing signal 57 is transmitted to the coil 55, such that the spring 50 begins to bias the valve arm 43 further to the left, from the disengaged position of FIG. 4, toward an operating position, shown in FIG. 5. In the first operating position, the fluid inlet port 63 is quickly opened, because the transverse surface 75 moves axially away from the transversely oriented entrance of the inlet port 63. As soon as the inlet port 63 is uncovered, a substantial quantity of fluid flows through the inlet port 63, then flows radially outward through the operating chamber 35 (see arrows in FIG. 5), and into the rearward land and groove area in a well known manner. Typically, fluid entering the rearward land and groove area would be able to flow into the forward land and groove area through appropriate openings in the input coupling member 11. The fluid level line M2 shown in FIGS. 5 and 7 represents the fluid level in the reservoir 33 once the inlet port 63 is fully opened, but before the inlet port 67 begins to open. In accordance with one important aspect of the invention, and as may be seen by comparing FIGS. 4 and 5, a large quantity of fluid enters the viscous shear space 59 rather quickly, as the valve arm 43 moves away from the disengaged position, to begin to get fluid flowing radially outward through the lands and grooves, to bring the fan speed up fairly quickly from the disengaged level.

Thus, in the subject embodiment, the fan speed rose to about 400 RPM after the inlet port 63 was fully uncovered, but thereafter, the valve member 43 passes through a dead band region D1 (see FIG. 7) until the cylindrical surface 77 begins to uncover the inlet port 67. As the valve member 43 moves through this dead band region, and the fluid meniscus reaches M2, the fan speed will be predictable, even if there are inaccuracies in the manufacturing of the various parts of the valving and coupling. The dead band region D1 provides the valving an opportunity to reach a predictable, desired fill level within the operating chamber.

As the temperature increases further, the signal 57 is decreased further, and the valve arm 43 continues to move to the left, toward the position shown in FIG. 5. As the cylindrical surface 77 of the valve portion 74 slides relative to the cylindrical surface 65, this movement constitutes the "modulation" range of the valving action. Unlike the opening of the inlet port 63, which occurred suddenly (high gain rate), the opening of the inlet port 67 occurs more slowly (low gain rate of filling versus valve arm movement). Thus, the valve arm 43 must move from a position completely blocking the inlet port 67 to a position fully exposing the inlet port 67, in order for the fluid level in the reservoir chamber 33 to decrease from the line M2 shown in FIG. 5 to a level which is even with the cylindrical surface 65 (shown as M3 in FIG. 7). Typically, the quantity of fluid admitted through the inlet port 67 would be less than that which flows through the inlet port 63, and may be substantially less, even though the flow through the inlet port 67 occurs over a greater extent of valve arm travel.

As the temperature continues to increase, the valve arm 43 moves further to the left, from the position shown in FIG. 5, until the inlet port 67 is full uncovered, and the fluid level in the reservoir chamber 33 "decreases" (i.e., moves radially outward) until it is even with the cylindrical surface 65, or reaches the level M3, as mentioned previously. Once the valve member 43 has fully uncovered the inlet port 67, the valve member then passes through another dead band region D2, again referring to FIG. 3A. As was described in regard to the dead band region D1, passing through the dead band region D2 insures that there is the desired fill level within the operating chamber 35. At that point in the valve arm movement, the surfaces 69 and 71 of the member 29, and the surfaces 77 and 79 of the valve portion 74 cooperate to define an annular chamber filled with fluid. With further leftward movement of the valve arm 43, the cylindrical surface 81 begins to uncover the inlet port 73, and the fluid in the annular chamber defined by the surfaces 69, 71, 77, and 79 begins to flow through the inlet port 73 and into the forward lands and grooves. Preferably, the filling through the inlet port 73 occurs at a gain rate approximately equal to that for the inlet port 67, recognizing that most of the operation of the fan drive would probably occur with the valve arm 43 moving through the modulation range, and the inlet port 73 is included primarily to be sure that the fan drive can achieve "peak speed", i.e., the maximum fan speed anticipated, for any given input speed.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed:

1. A fluid coupling device of the type including a first rotatable coupling member defining an axis of rotation, enclosure means associated with said first coupling member to define a fluid chamber therebetween; valve means disposed to separate said fluid chamber into a fluid operating chamber and a fluid reservoir chamber; a second rotatable coupling member disposed in said fluid operating chamber and being rotatable relative to said first coupling member, at least one of said first coupling member and said enclosure means cooperating with said second coupling member to define therebetween a viscous shear space; said valve means being operable to control the flow of fluid between said reservoir chamber and said operating chamber, and including control means associated with said valve means to effect the operation thereof in response to variations in a predetermined condition; said valve means including a plate-like member defining a fluid inlet port disposed to permit fluid flow from said reservoir chamber to said operating chamber, said valve means further including a moveable valve member operably associated with said control means, characterized by:

(a) said plate-like member defining a first inlet port, and a second inlet port disposed radially outward of said first inlet port;

(b) said moveable valve member having a disengaged position blocking flow through both said first and second inlet ports;

(c) said valve member being configured such that, as said valve member moves from said disengaged position, toward a first operating position, said first inlet port is uncovered while said second inlet port remains covered; and (d) as said valve member moves from said first operating position toward a second operating position, said second inlet port is progressively uncovered.

2. A fluid coupling device as claimed in claim 1 characterized by said plate-like member defining a third inlet port disposed radially outward of said second inlet port, said moveable valve member blocking flow through said third inlet port when said valve member is in any one of said disengaged position, said first operating position and said second operating position; said valve member being configured such that, as said valve member moves from said second operating position to a third operating position, said third inlet port is uncovered.

3. A fluid coupling device as claimed in claim 2 characterized by said moveable valve member passes through a first dead band region after uncovering said first inlet port but before beginning to uncover said second inlet port, then passes through a second dead band region after uncovering said second inlet port but before beginning to uncover said third inlet port.

4. A fluid coupling device as claimed in claim 1 characterized by said second rotatable coupling member includes said plate-like member, and an additional enclosure means cooperating with said plate-like member to define said fluid reservoir chamber, whereby said fluid reservoir chamber rotates at the speed of rotation of said second rotatable coupling member.

5. A fluid coupling device as claimed in claim 4 characterized by said plate-like member defining a first, transverse surface defining said first inlet port, and a second, cylindrical surface defining said second inlet port, said valve member defining a first, transverse surface disposed to block fluid flow through said first inlet port when said valve member is in said disengaged position, said valve member further defining a second, cylindrical surface in sliding engagement with said second, cylindrical surface of said plate-like member, as said valve member moves from said disengaged position toward said first operating position.

6. A fluid coupling device as claimed in claim 5 characterized by said control means comprises an electromagnetic coil and an axially moveable armature, whereby said valve member moves axially between said disengaged position and said third operating position.

7. A fluid coupling device as claimed in claim 6 characterized by said control means includes a spring biasing said valve member toward said third operating position, said predetermined condition comprising an electrical input signal to id electromagnetic coil, said valve member moving axially from said third operating position toward said disengaged position as said electrical input signal increases.

8. A fluid coupling device as claimed in claim 1 characterized by means operable to pump fluid from said operating chamber to said reservoir chamber in response to a difference in speed of rotation of said first and second coupling members.

* * * * *